United States Patent
Evans et al.

(10) Patent No.: US 10,823,888 B1
(45) Date of Patent: Nov. 3, 2020

(54) METHODS OF PRODUCING SLANTED GRATINGS WITH VARIABLE ETCH DEPTHS

(71) Applicant: APPLIED Materials, Inc., Santa Clara, CA (US)

(72) Inventors: Morgan Evans, Manchester, MA (US); Rutger Meyer Timmerman Thijssen, Sunnyvale, CA (US); Joseph C. Olson, Beverly, MA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 16/681,260

(22) Filed: Nov. 12, 2019

(51) Int. Cl.
*G02B 5/18* (2006.01)
*B29D 11/00* (2006.01)
*G02B 6/02* (2006.01)

(52) U.S. Cl.
CPC ...... *G02B 5/1857* (2013.01); *B29D 11/00769* (2013.01); *G02B 5/1828* (2013.01); *G02B 6/02138* (2013.01)

(58) Field of Classification Search
None
See application file for complete search history.

(56) References Cited

U.S. PATENT DOCUMENTS 10,690,821 B1 * 6/2020 Evans ............... G02B 5/1842
2019/0324202 A1 * 10/2019 Colburn ............ G02B 5/1857

* cited by examiner

*Primary Examiner* — Chad H Smith

(57) ABSTRACT

Methods of producing gratings with trenches having variable height are provided. In one example, a method of forming a diffracted optical element may include providing an optical grating layer over a substrate, patterning a hardmask over the optical grating layer, and forming a sacrificial layer over the hardmask, the sacrificial layer having a non-uniform height measured from a top surface of the optical grating layer. The method may further include etching a plurality of angled trenches into the optical grating layer to form an optical grating, wherein a first depth of a first trench of the plurality of trenches is different than a second depth of a second trench of the plurality of trenches.

15 Claims, 8 Drawing Sheets

METHODS OF PRODUCING SLANTED GRATINGS WITH VARIABLE ETCH DEPTHS

FIELD OF THE DISCLOSURE

Embodiments of the present disclosure generally relate to methods of producing optical gratings. More specifically, the disclosure relates to methods of producing slanted optical gratings with trenches having variable depths.

BACKGROUND OF THE DISCLOSURE

Optical elements such as optical lenses have long been used to manipulate light for various advantages. Recently, micro-diffraction gratings have been utilized in holographic and augmented/virtual reality (AR and VR) devices. One particular AR and VR device is a wearable display system, such as a headset, arranged to display an image within a short distance from a human eye. Such wearable headsets are sometimes referred to as head mounted displays, and are provided with a frame displaying an image within a few centimeters of the user's eyes. The image can be a computer-generated image on a display, such as a micro display. The optical components are arranged to transport light of the desired image, where the light is generated on the display to the user's eye to make the image visible to the user. The display where the image is generated can form part of a light engine, so the image generates collimated light beams guided by the optical component to provide an image visible to the user.

Different kinds of optical components have been used to convey the image from the display to the human eye. To properly function in an augmented reality lens or combiner, the geometries of an optical grating may be designed to achieve various effects. In some devices, multiple different regions, such as two or more different regions, are formed on the surface of a lens, wherein the grating geometries in one region are different from the grating geometries in other regions.

Angled surface relief optical gratings can be produced by the direct etching of angled trenches into a substrate or a film stack on a substrate. One of the parameters controlling the efficiency of the optical grating is the trench depth. Unfortunately, current approaches of forming optical gratings with varied heights, widths, and/or shapes across diffracting and viewing fields have proved challenging.

Therefore, there is a need for improved methods of producing gratings having trenches with variable depth.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Embodiments of the present disclosure provide a method of forming a diffracted optical element, the method including providing an optical grating layer over a substrate, patterning a hardmask over the optical grating layer, and forming a sacrificial layer over the hardmask, the sacrificial layer having a non-uniform height measured from a top surface of the optical grating layer. The method may further include etching a plurality of angled trenches into the optical grating layer to form an optical grating, wherein a first depth of a first trench of the plurality of trenches is different than a second depth of a second trench of the plurality of trenches.

Embodiments of the present disclosure further provide a method of forming a diffracted optical element, including providing an optical grating layer over a substrate, providing a hardmask over the optical grating layer, the hardmask including a set of openings, and forming a sacrificial layer over the hardmask. The method may further include forming a recess in the sacrificial layer, wherein the recess causes the sacrificial layer to have a non-uniform height measured from a top surface of the optical grating layer, and etching a plurality of angled trenches through the optical grating layer to form an optical grating, wherein a first depth of a first trench of the plurality of angled trenches is different than a second depth of a second trench of the plurality of trenches.

Embodiments of the present disclosure further provide a method of forming a diffracted optical element, including providing an optical grating layer over a substrate, patterning a hardmask over the optical grating layer, and depositing the sacrificial layer atop the hardmask. The method may further include removing a portion of the sacrificial layer to create a trench in the sacrificial layer, the trench including a sloped bottom surface defining a first plane, the first plane being non-parallel with a second plane defined by a top surface of the optical grating layer, and etching a plurality of angled trenches into the optical grating layer to form an optical grating, wherein a first depth of a first trench of the plurality of trenches is different than a second depth of a second trench of the plurality of trenches.

BRIEF DESCRIPTION OF THE DRAWINGS

The accompanying drawings illustrate exemplary approaches of the disclosure, including the practical application of the principles thereof, as follows.

Figure 1:
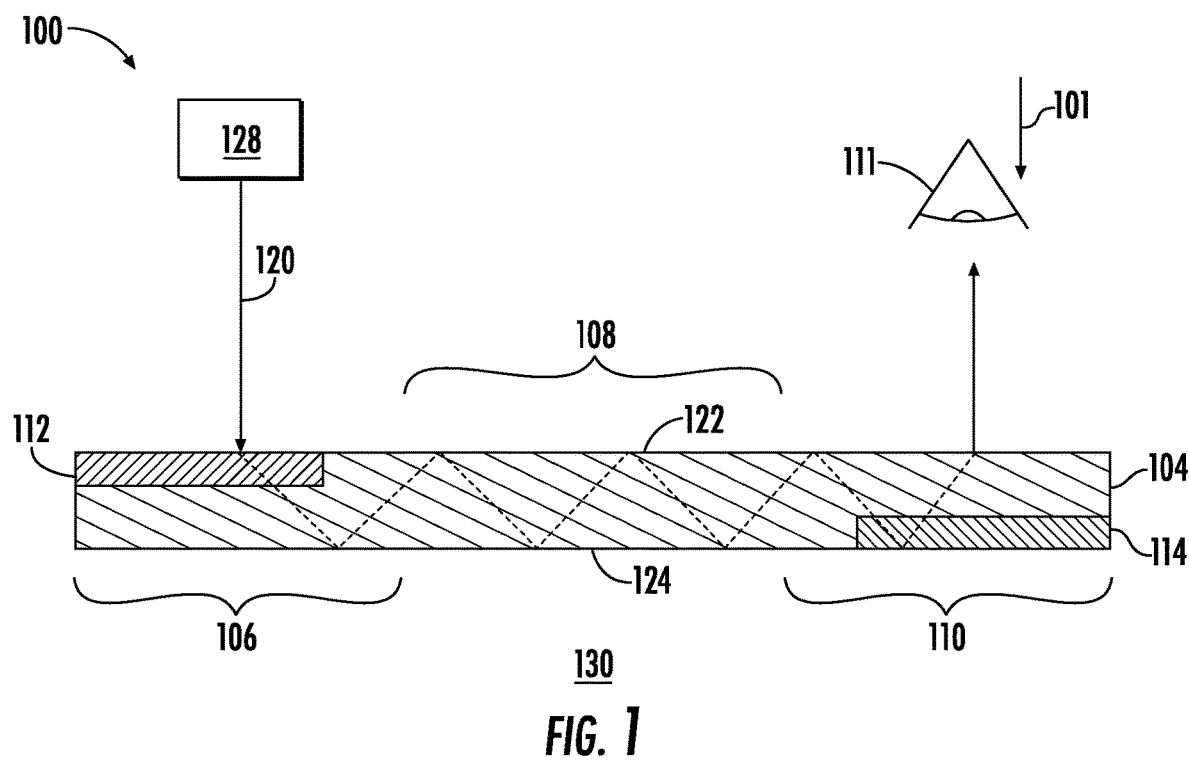
FIG. 1 is a schematic, cross-sectional view of a display apparatus according to embodiments of the disclosure.

The drawings are not necessarily to scale. The drawings are merely representations, not intended to portray specific parameters of the disclosure. The drawings are intended to depict exemplary embodiments of the disclosure, and therefore are not be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

DETAILED DESCRIPTION

Methods in accordance with the present disclosure will now be described more fully hereinafter with reference to the accompanying drawings, where embodiments of the methods are shown. The methods may be embodied in many different forms and are not to be construed as being limited to the embodiments set forth herein. Instead, these embodiments are provided so the disclosure will be thorough and complete, and will fully convey the scope of the system and method to those skilled in the art.

FIG. 1 is a schematic, cross-sectional view of a waveguide 104 implemented in a display apparatus 100. The display apparatus 100 may be configured for augmented, virtual, and mixed or merged reality applications as well as other display applications, for example, hand held display devices.

The display apparatus 100 uses the waveguide 104 for transparent viewing of an ambient environment 130 through the waveguide 104, such as for a user viewing the environment 130 from a user perspective 101. When implemented in the display apparatus 100, a first surface 122 of the waveguide 104 is disposed adjacent to, and facing, a user's eye 111. A second surface 124 of the waveguide 104 is disposed opposite the first surface 122 and adjacent to and facing the ambient environment 130. Although illustrated as being planar, the waveguide 104 may be curved, depending upon the desired application.

The display apparatus 100 further includes an image microdisplay 128 to direct light 120 of a generated, virtual image into the waveguide 104. The light 120 of the virtual image is propagated in the waveguide 104. Generally, the waveguide 104 includes an input coupling region 106, a waveguide region 108, and an output coupling region 110. The input coupling region 106 receives light 120 (a virtual image) from the image microdisplay 128 and the light 120 travels through the waveguide region 108 to the output coupling region 110 where the user's perspective 101 and field of view enable visualization of a virtual image overlaid on the ambient environment 130. The image microdisplay 128 is a high-resolution display generator, such as a liquid crystal on silicon microdisplay operable to project the light of the virtual image into the waveguide 104.

The waveguide 104 includes input grating structures 112 and output grating structures 114. The input grating structures 112 are formed on the waveguide 104 in an area corresponding to the input coupling region 106. The output grating structure 114 are formed on the waveguide 104 in an area corresponding to the output coupling region 110. The input grating structures 112 and output grating structure 114 influence light propagation within the waveguide 104. For example, the input grating structure 112 couples in light from the image microdisplay 128 and the output grating structure couples out light to the user's eye 111.

For example, the input grating structures 112 influence the field of view of a virtual image displayed at the user's eye 111. The output grating structures 114 influence the amount of light 120 collected and outcoupled from the waveguide 104. In addition, the output grating structures 114 modulate the field of view of a virtual image from a user's perspective 101 and increase the viewing angle a user can view the virtual image from the image microdisplay 128. In another example, a grating structure (not shown) is also formed in the waveguide region 108 between the input coupling region 106 and the output coupling region 110. Additionally, multiple waveguides 104, each with desired grating structures formed therein, can be used to form the display apparatus 100.

Figure 2A:
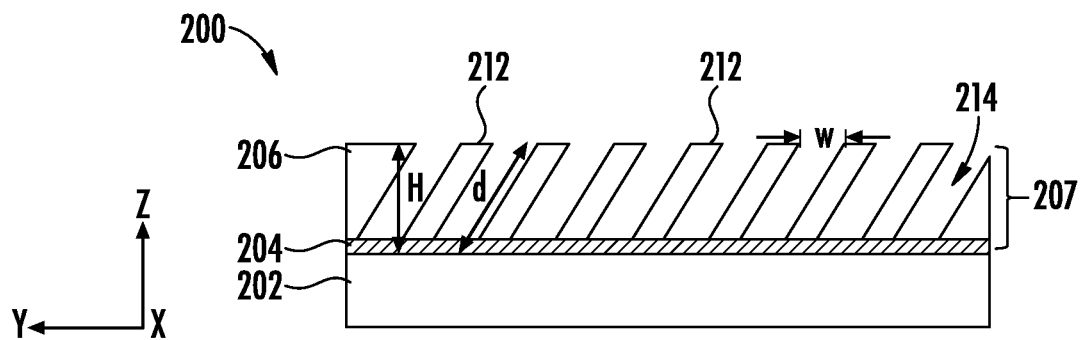
FIG. 2A depicts a side cross sectional view of an optical grating component according to embodiments of the disclosure.
Figure 2B:
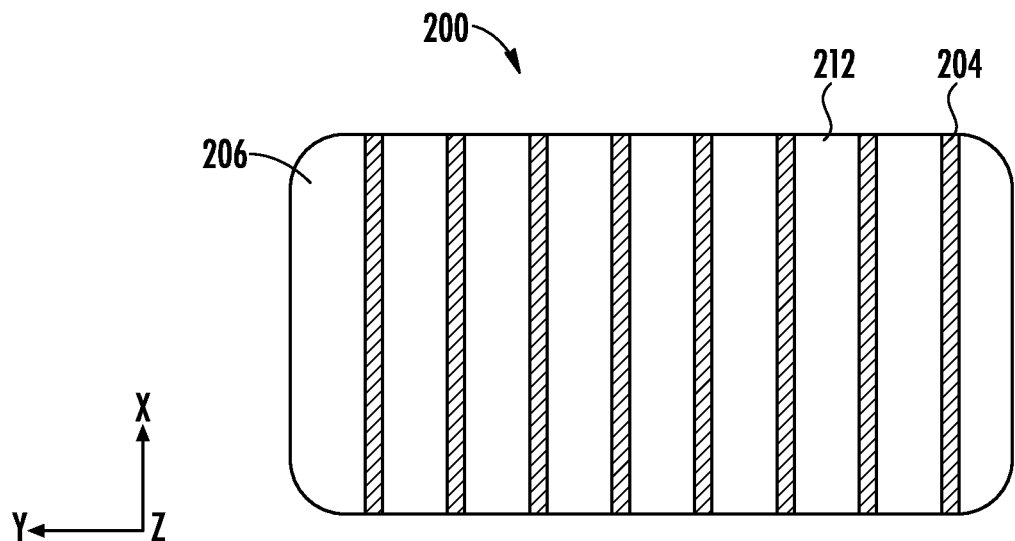
FIG. 2B depicts a top plan view of the optical grating component of FIG. 2A according to embodiments of the disclosure.

FIG. 2A depicts a side cross sectional view of an optical grating component 200, according to embodiments of the disclosure. FIG. 2B depicts a top plan view of the optical grating component 200. The optical grating component 200 may be used as an optical grating to be placed on an eyeglass or formed integrally in the eyeglass in accordance with various embodiments of the disclosure. The optical grating component 200 includes a substrate 202, and an optical grating 206 disposed on the substrate 202. The optical grating 206 may be the same or similar to the input grating structure 112 and/or the output grating structure 114 of FIG. 1. In some embodiments, the substrate 202 is an optically transparent material, such as a known glass. In some embodiments, the substrate 202 is silicon. In the latter case, the substrate 202 is silicon, and another process is used to transfer grating patterns to a film on the surface of another optical substrate, such as glass or quartz. The embodiments are not limited in this context. The optical grating 206 may be disposed in an optical grating layer 207, as described further below. In the non-limiting embodiment of FIG. 2A and FIG. 2B, the optical grating component 200 further includes an etch stop layer 204, disposed between the substrate 202 and optical grating layer 207. According to some embodiments of the disclosure, the optical grating layer 207 may be an optically transparent material, such as silicon oxide, silicon nitride, glass, $TiO_2$, or other material.

According to some embodiments of the disclosure, the optical grating 206 may comprise a grating height H in the range of 100 nm to 1000 nm. As such, the optical grating 206 may be appropriate for use in an eyepiece of an AR &VR apparatus. Embodiments herein are not limited in this context. In accordance with some embodiments, the etch stop layer 204 may be an optically transparent material and may have a thickness of 10 nm to 100 nm. The embodiments are not limited in this context. Examples of a suitable material for the etch stop layer 204 include SiN, $SiO_2$, TiN, SiC, and other materials. In embodiments where the optical grating 206 is to be applied to or incorporated in an eyepiece of an eyeglass, an especially appropriate material is an optically transparent material. In embodiments where the optical grating component 200 forms a master for fabricating optical gratings for an eyepiece, the etch stop layer 204 need not be optically transparent. Moreover, the etch stop layer 204 may be omitted in some embodiments.

As further shown in FIG. 2A, the optical grating 206 may comprise a plurality of angled structures, shown as angled components or structures 212, disposed at a non-zero angle of inclination with respect to a perpendicular to a plane (e.g., x-y plane) of the substrate 202. The angled structures 212 may be included within one or more fields of slanted gratings, the slanted grating together forming "microlenses." In the example of FIG. 2A, define a uniform height along the direction parallel to the Y-axis of the Cartesian coordinate system shown, where the first direction (y-axis) is parallel to the plane of the substrate 202, in this case the x-y plane. In other embodiments, the angled structures 212 may define a variable height along the direction parallel to the y-axis. The plurality of trenches 214 may be disposed at a non-zero angle of inclination with respect to a perpendicular to a plane, such as a top surface of the substrate 202 or a top surface of optical grating layer 207. As will be described in greater detail below, the depth 'd' and/or the width 'w' of one or more trenches of the plurality of trenches

214 may vary due to the presence of a mask or sacrificial layer provided over the optical grating 206 prior to etching.

In some embodiments, the width of the optical grating 206 along the Y-direction may be on the order of several millimeters to several centimeters, while the grating height H may be on the order of 1 micrometer or less. Accordingly, the variation in grating height H may range on the order of several hundred nanometers or less. An example of a smooth variation in grating height H or depth d is where a change in grating height H or depth d between adjacent lines of a grating is less than 10%, less than 5%, or less than 1%. The embodiments are not limited in this context. Thus, in an eyepiece, the grating height H may vary continuously and in a non-abrupt fashion in a given direction along the surface of the eyepiece over a distance of, for example, millimeters to centimeters. More particularly, a change in grating height H of 50% over a 5 mm distance may entail changing the grating height H continuously over approximately $5 \times 10^3$ lines having a pitch of one micrometer. The change entails an average change in relative height of adjacent lines of $0.5/5 \times 10^4$ or approximately 0.01%.

Figure 3A:
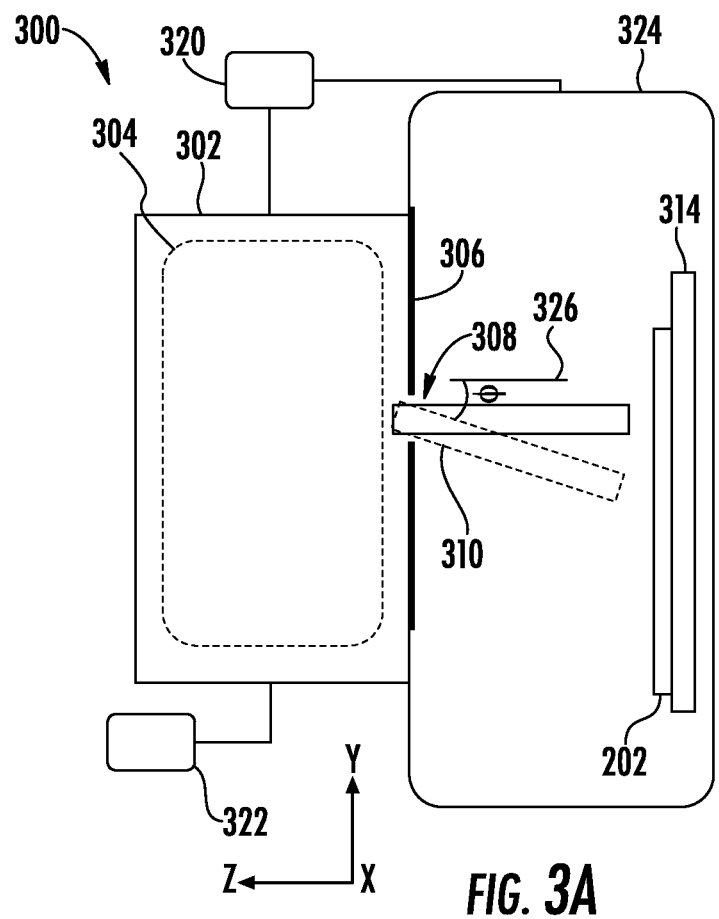
FIG. 3A shows a processing apparatus, depicted in schematic form, in accordance with embodiments of the present disclosure.

Turning now to FIG. 3A, there is shown a processing apparatus 300, depicted in schematic form. The processing apparatus 300 represents a processing apparatus for etching portions of a substrate, or depositing on a substrate, to generate, for example, the optical gratings of the present embodiments. The processing apparatus 300 may be a plasma based processing system having a plasma chamber 302 for generating a plasma 304 therein by any convenient method as known in the art. An extraction plate 306 may be provided as shown, having an extraction aperture 308, where a non-uniform etching or non-uniform deposition may be performed to reactively etch or deposit an optical grating layer 207 (FIGS. 2A-2B). A substrate 202, including, for example, the aforementioned optical grating structure, is disposed in the process chamber 324. A substrate plane of the substrate 202 is represented by the X-Y plane of the Cartesian coordinate system shown, while a perpendicular to the plane of the substrate 202 lies along the Z-axis (Z-direction).

As further shown in FIG. 3A, an ion beam 310 may be extracted when a voltage difference is applied using bias supply 320 between the plasma chamber 302 and substrate 202, or substrate platen 314, as in known systems. The bias supply 320 may be coupled to the process chamber 324, for example, where the process chamber 324 and substrate 202 are held at the same potential.

According to various embodiments, the ion beam 310 may be extracted along the perpendicular 326 or may be extracted at a non-zero angle of incidence, shown as ϕ, with respect to the perpendicular 326.

The trajectories of ions within the ion beam 310 may be mutually parallel to one another or may lie within a narrow angular spread range, such as within 10 degrees of one another or less. In other embodiments, as will be discussed below, the trajectory of ions within the ion beam 310 may converge or diverge from one another, for example, in a fan shape. Thus, the value of ϕ may represent an average value of incidence angle where the individually trajectories vary up to several degrees from the average value. In various embodiments, the ion beam 310 may be extracted as a continuous beam or as a pulsed ion beam as in known systems. For example, the bias supply 320 may be configured to supply a voltage difference between the plasma chamber 302 and the process chamber 324, as a pulsed DC voltage, where the voltage, pulse frequency, and duty cycle of the pulsed voltage may be independently adjusted from one another.

In various embodiments, gas, such as reactive gas, may be supplied by the source 322 to plasma chamber 302. The plasma 304 may generate various etching species or depositing species, depending upon the exact composition of species provided to the plasma chamber 302.

Figure 3B:
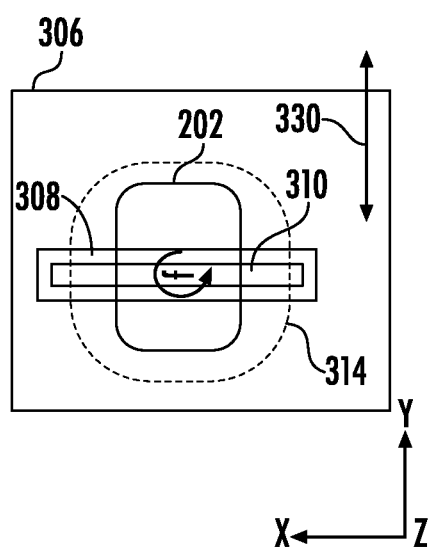
FIG. 3B shows an extraction plate component and substrate in top plan view in accordance with embodiments of the present disclosure.

In various embodiments, the ion beam 310 may be provided as a ribbon reactive ion beam having a long axis extending along the X-direction of the Cartesian coordinate system shown in FIG. 3B. By scanning a substrate platen 314 including substrate 202 with respect to the extraction aperture 308, and thus with respect to the ion beam 310 along the scan direction 330, the ion beam 310 may etch the substrate 202 or deposit upon the substrate 202. The ion beam 310 may be composed of any convenient gas mixture, including inert gas, reactive gas, and may be provided in conjunction with other gaseous species in some embodiments. In particular embodiments, the ion beam 210 and other reactive species may be provided as an etch recipe to the substrate 202 so as to perform a directed reactive ion etching (RIE) of a layer, such as the optical grating layer 207. Such an etch recipe may use known reactive ion etch chemistries for etching materials such as oxide or other material, as known in the art. In other embodiments, the ion beam 310 may be formed of inert species where the ion beam 310 is provided to etch the substrate 202 or more particularly, the optical grating layer 207, by physical sputtering, as the substrate 202 is scanned with respect to ion beam 310.

In the example of FIG. 3B, the ion beam 310 is provided as a ribbon reactive ion beam extending to a beam width along the X-direction, where the beam width is adequate to expose an entire width of the substrate 202, even at the widest part along the X-direction. Exemplary beam widths may be in the range of 10 cm, 20 cm, 30 cm, or more while exemplary beam lengths along the Y-direction may be in the range of 2 mm, 3 mm, 5 mm, 10 mm, or 20 mm. The embodiments are not limited in this context.

Notably, the scan direction 330 may represent the scanning of substrate 202 in two opposing (180 degrees) directions along the Y-direction, or just a scan toward the left or a scan toward the right. As shown in FIG. 3B, the long axis of ion beam 310 extends along the X-direction, perpendicularly to the scan direction 330. Accordingly, an entirety of the substrate 202 may be exposed to the ion beam 310 when scanning of the substrate 202 takes place along a scan direction 330 to an adequate length from a left side to right side of substrate 202.

The grating features, such as the angled structures 212 of FIGS. 2A-2B, may be accomplished by scanning the substrate 202 with respect to the ion beam 310 using a processing recipe. In brief, the processing recipe may entail varying at least one process parameter of a set of process parameters, having the effect of changing, e.g., the etch rate or deposition rate caused by the ion beam 310 during scanning of the substrate 202. Such process parameters may include the scan rate of the substrate 202, the ion energy of the ion beam 310, duty cycle of the ion beam 310 when provided as a pulsed ion beam, the spread angle of the ion beam 310, and rotational position of the substrate 202. In at least some embodiments herein, the processing recipe may further include the material(s) of the optical grating layer 207, and the chemistry of the etching ions of the ion beam 310. In yet other embodiments, the processing recipe may include starting geometry of the optical grating layer 207, including dimensions and aspect ratios. The embodiments are not limited in this context.

Figure 4A:
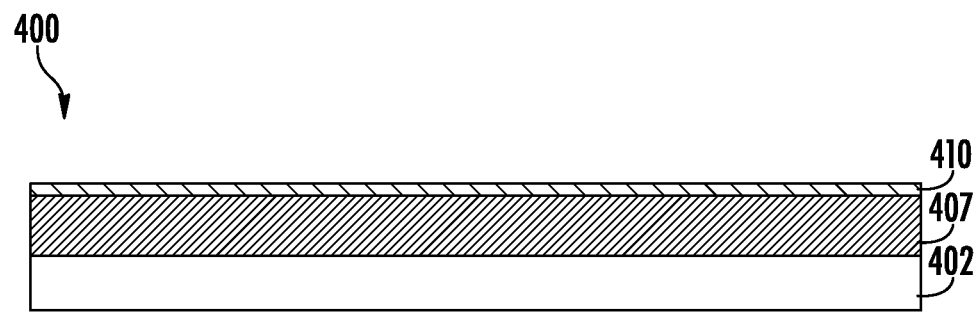
FIGS. 4A-4F are side cross-sectional views depicting formation of angled structures in accordance with embodiments of the present disclosure.

FIGS. 4A-4E demonstrate a process for forming a diffracted optical element 400 according to embodiments of the present disclosure. As shown in FIG. 4A, an optical grating layer 407 may be formed over a substrate 402, and a hardmask layer 410 may be formed over the optical grating layer 407. Although not shown, in some embodiments, an etch stop layer may be provided between the substrate 402 and the optical grating layer 407. The etch stop layer is formed from a material, such as titanium nitride or tantalum nitride, among others, resistant to an etching process. The substrate 402 may be made from an optically transparent material, such as glass. The optical grating layer 407 and/or the hardmask 410 may be formed, for example, by a chemical vapor deposition (CVD) process, a physical vapor deposition (PVD) process, or a spin-on process.

The grating layer 407 may be formed from an optically transparent material. In one example, the grating layer 407 is formed from a silicon-based material, such as silicon nitride or silicon oxide, or a titanium-based material, such as titanium oxide. The material of the grating layer 407 has a high refractive index, such as approximately 1.3-2.4, or higher. Generally, the grating layer 407 has a thickness less than approximately 1 micrometer, such as between approximately 150 nm and 700 nm. Embodiments herein are not limited in this context, however.

Figure 4B:
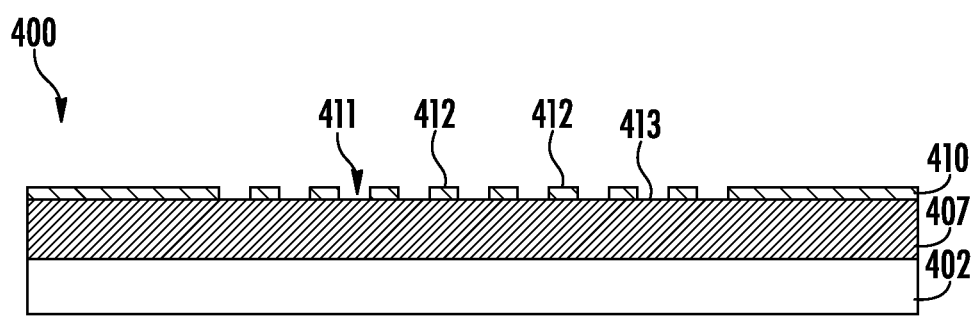

As shown in FIG. 4B, the hardmask 410 may be patterned to form a set of openings or gaps 411 therein. In some embodiments, the hardmask 410 is formed from a photoresist stack (not shown), wherein a hardmask layer is conformally formed over the grating layer 407. The hardmask 410 is, for example, formed from titanium nitride using a chemical vapor deposition process. As shown, the hardmask 410 is formed as a plurality of hardmask elements 412 separated from one another by gaps 411. Each of the gaps 411 may be formed using an etch process selective to a top surface 413 of the optical grating layer 407. In some embodiments, the hardmask elements 412 are formed by etching a photoresist stack. In some embodiments, the hardmask elements 412 have a same height and/or width. In other embodiments, one or more of the hardmask elements 412 has a different or non-uniform height and/or thickness.

Figure 4C:
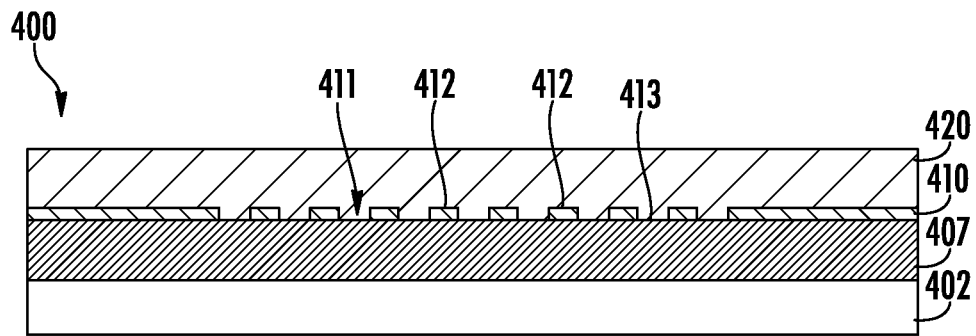

As shown in FIG. 4C, a sacrificial layer 420 may then be formed over the optical grating layer 407 and the hardmask 410. In some embodiments, the sacrificial layer 420 is a mask deposited over the optical grating layer 407 and the hardmask 410. In non-limiting embodiments, the sacrificial layer 420 may be a photoresist-type material formed over the diffracted optical element 400, for example, using 3-D printing. In other embodiments, the sacrificial layer 420 may be an optically transparent material, such as silicon. In one non-limiting embodiment, the sacrificial layer 420 may be silicon nitride, which beneficially provides uniform properties during both vertical and angled etching.

Figure 4D:
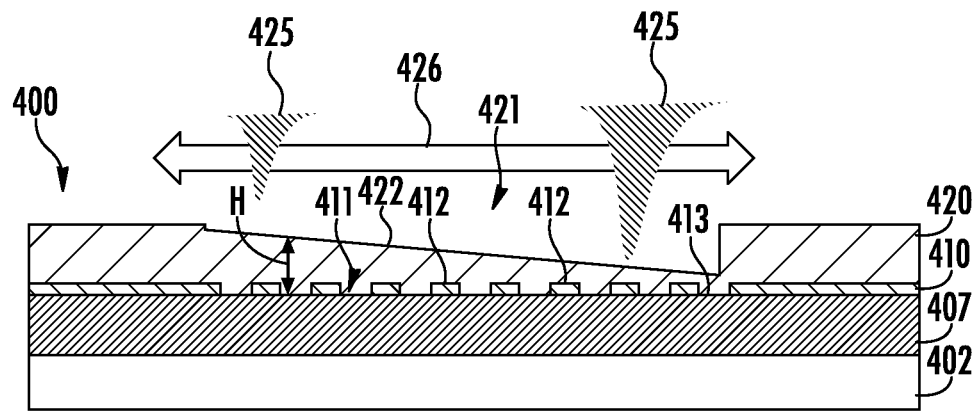

As shown in FIG. 4D, the sacrificial layer 420 may be recessed using a subtractive process 425, such as ion etching, reactive or sputter. In the embodiment shown, the subtractive process 425 may be a reactive ion etch (RIE), traversing along direction 426, to generate the sacrificial layer 420 with variable height 'H' relative to the top surface 413 of the optical grating layer 407. For example, the sacrificial layer 420 may be processed to create a recess or trench 421 having a sloped bottom surface 422. As shown, the sloped bottom surface 422 may define a plane, which is non-parallel with a plane defined by the top surface 413 of the optical grating layer 407. Although non-limiting, the sloped bottom surface 422 may be generally planar and/or curved. Furthermore, the direction of the ramp of the sloped bottom surface 422 need not be aligned with a grating vector of the subtractive process 425.

Figure 4E:
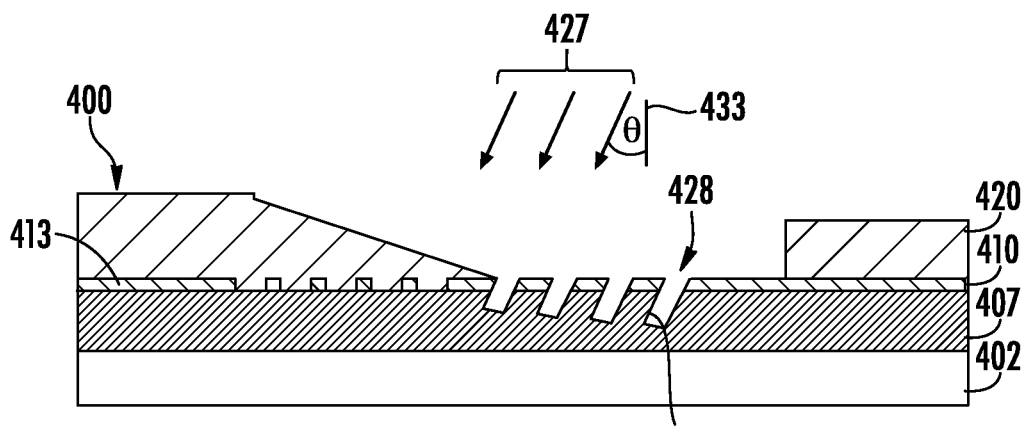

As shown in FIG. 4E, the diffracted optical element 400 is then etched 427 to form plurality of angled trenches 428 through the sacrificial layer 420 and the optical grating layer 407. In some embodiments, the etch 427 is an angled ion etch, wherein the angled ion etch is performed by a reactive ion beam. The substrate 402 may be scanned along a scan direction with respect to the reactive ion beam. As shown, the etch 427 may be delivered at a non-zero angle ($\theta$) with respect to a perpendicular 433 to a plane defined by the top surface 413 of the optical grating layer 407. During the etch process, the hardmask 410 and the sacrificial layer 420 function as a pattern guide for formation of a plurality of slanted grating structures 430 from the optical grating layer 407. It will be appreciated that more complex and/or nuanced shapes of the slanted grating structures 430 can be achieved by first creating the non-uniform sacrificial layer 420, and then running additional selective area processing (SAP) etch cycles during the etch 427.

Figure 4F:
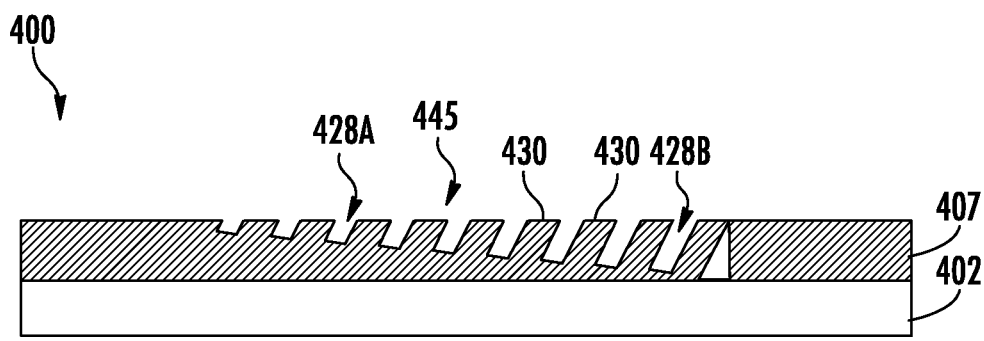

The sacrificial layer 420 and the hardmask 410 may then be removed from over each of the slanted grating structures 430, resulting in an optical grating 445 shown in FIG. 4F. In some embodiments, a first depth of a first trench 428A of the plurality of trenches is different than a second depth of a second trench 428B due to the variable height of the sacrificial layer 420.

Figure 5A:
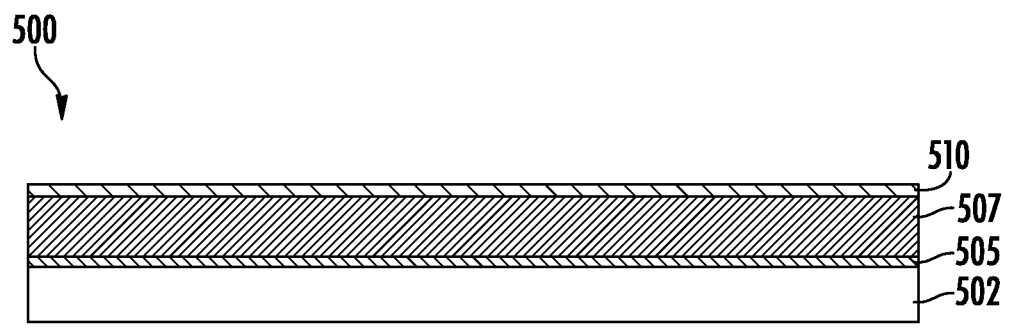
FIGS. 5A-5H are side cross-sectional views depicting formation of angled structures in accordance with embodiments of the present disclosure.

FIGS. 5A-5H demonstrate a process for forming a diffracted optical element 500 according to embodiments of the present disclosure. As shown in FIG. 5A, an optical grating layer 507 may be formed over a substrate 502, and a hardmask layer 510 may be formed over the optical grating layer 507. The diffracted optical element 500 may further include an etch stop layer 505 provided between the substrate 502 and the optical grating layer 507. The substrate 502 may be made from an optically transparent material, such as silicon. In some embodiments, the etch stop layer 505 may be formed, for example, by a chemical vapor deposition (CVD) process, a physical vapor deposition (PVD) process, or a spin-on process. The etch stop layer 505 is formed from a material, such as titanium nitride or tantalum nitride, among others, resistant to an etching process.

Figure 5B:
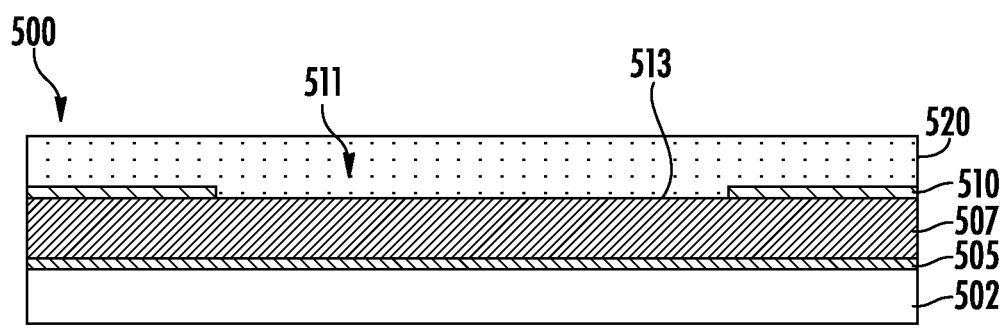

As shown in FIG. 5B, the hardmask 510 may be patterned to form an opening or gap 511 therein. In some embodiments, the hardmask 510 is formed from a photoresist stack (not shown), wherein a hardmask layer is conformally formed over the grating layer 507. The hardmask layer 510 is, for example, formed from titanium nitride using a chemical vapor deposition process. In some embodiments, the gap 511 may be formed using an etch process selective to a top surface 513 of the optical grating layer 507.

As further shown in FIG. 5B, a sacrificial layer 520 may be formed over the optical grating layer 507 and the patterned hardmask 510. In some embodiments, the sacrificial layer 520 is a mask deposited over the optical grating layer 507 and the hardmask 510. In non-limiting embodiments, the sacrificial layer 520 may be a photoresist-type material formed over the diffracted optical element 500, for example, using 3-D printing. In other embodiments, the sacrificial layer 520 may be an optically transparent material, such as a silicon-based material, e.g., silicon nitride or silicon oxide, or a titanium-based material, such as titanium oxide.

Figure 5C:
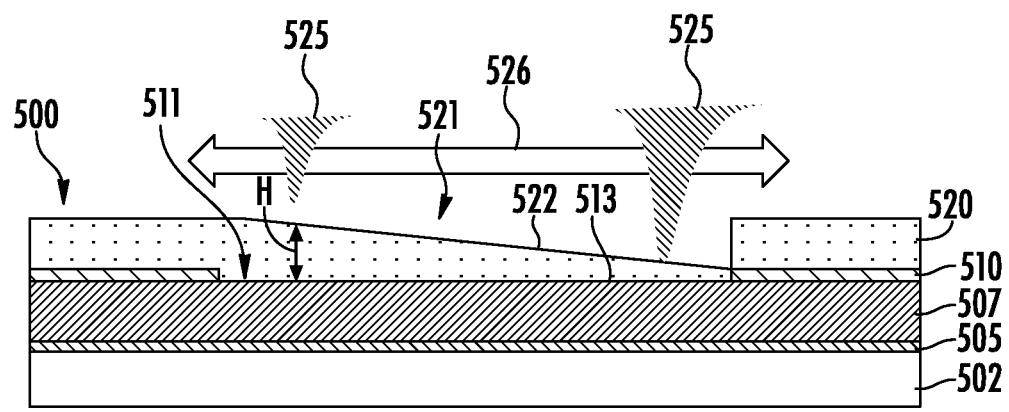

As shown in FIG. 5C, the sacrificial layer 520 may be recessed using a subtractive process 525, such as ion etching, reactive or sputter. In the embodiment shown, the subtractive process 525 may be RIE, traversing along direction 526, to generate the sacrificial layer 520 with variable height 'H' relative to the top surface 513 of the optical grating layer 507. For example, the sacrificial layer 420 may be processed to create a recess or trench 521 having a sloped bottom surface 522. As shown, the sloped bottom surface 522 may define a plane, which is non-parallel with a plane defined by the top surface 513 of the optical grating layer 507. Although non-limiting, the sloped bottom surface 522 may be generally planar and/or curved.

Figure 5D:
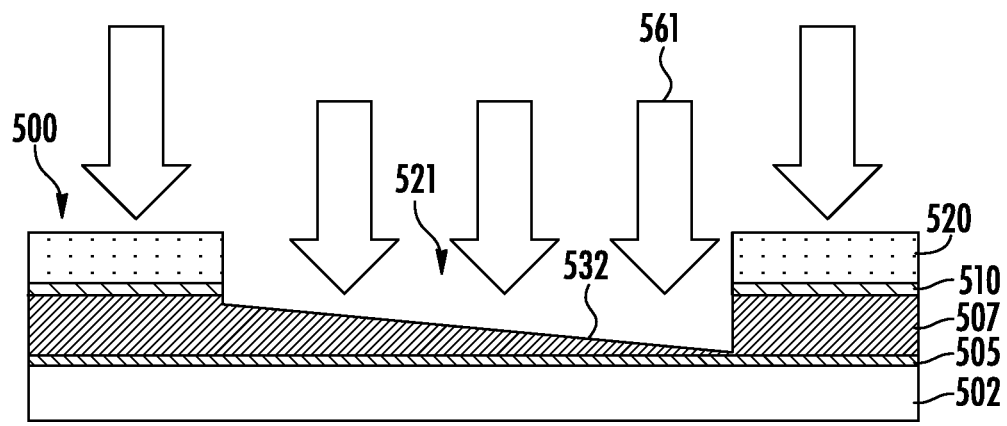

In some embodiments, as demonstrated in FIG. 5D, the sacrificial layer 520, including the trench 521 and the sloped bottom surface 522, may be transferred to the optical grating layer 507. In some embodiments, a variable etch depth (VED) profile, e.g., a 2-D wedge shape, may be formed using a vertical etch with a graytone screen (not shown), which is an optical device and method of variable exposure of a photoresist to achieve variable depth. More specifically, graytone lithography is a technique of photo-sculpting a resist film to create 3-D profiles in the photoresist via a single exposure process. Graytone lithography in combination with RIE allows the resist profiles to be transformed into 3-D structures.

As shown, a subtractive process 561 causes the trench 521 to further extend into optical grating layer 507 to create a sloped bottom surface 532 of the optical grating layer 507. Although non-limiting, the sloped bottom surface 532 may be generally planar and/or curved. By first shaping the sacrificial layer 520, precision may be improved in the optical grating layer 507.

Figure 5E:
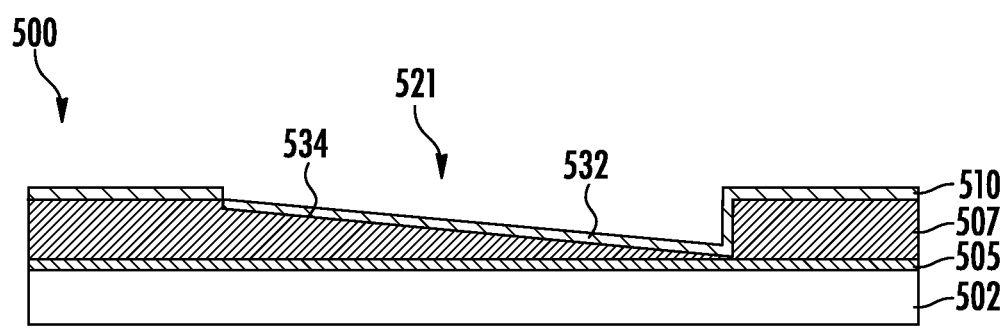

As demonstrated in FIG. 5E, any remaining portion of the sacrificial layer 520 may be removed, and a second hardmask 534 is formed within the trench 521. As shown, the second hardmask 534 is deposited atop the sloped bottom surface 532.

Figure 5F:
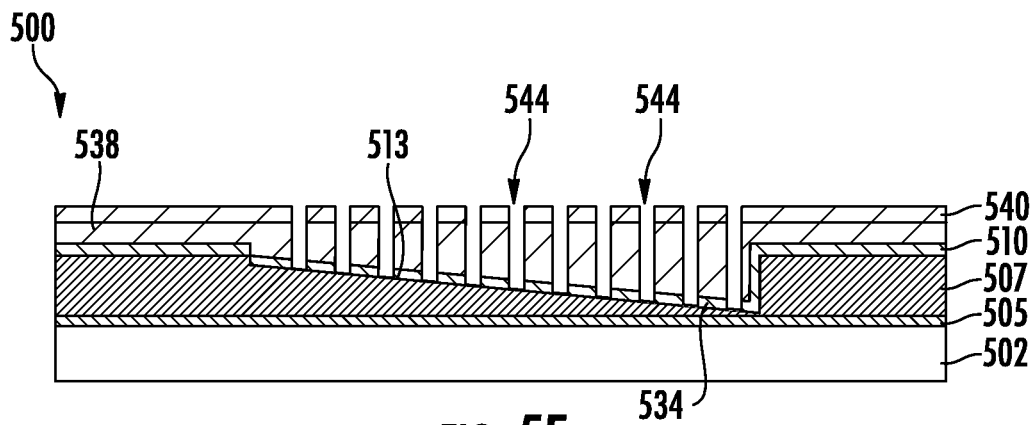
Figure 5G:
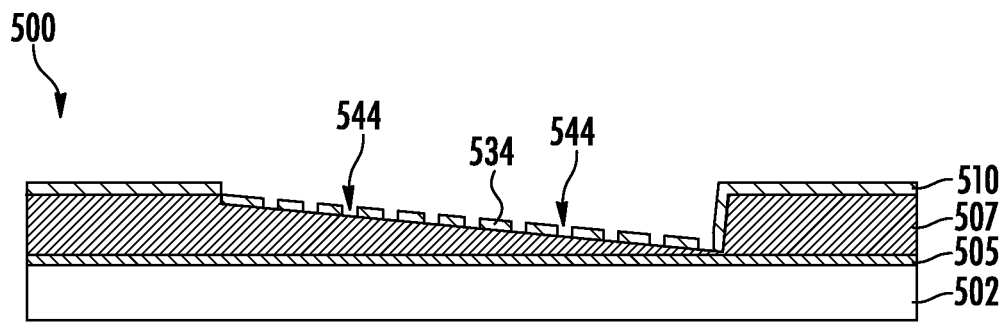

Next, as shown in FIG. 5F, an optical planarization layer (OPL) 538 and a photoresist (PR) 540 may be formed over the first hardmask 510 and the second hardmask 534. A plurality of vertical trenches 544 may then be formed through the OPL 538, the PR 540, and the second hardmask 534. In some embodiments, the vertical trenches 544 are formed by a vertical RIE selective to the top surface 513 of the optical grating layer 507. The OPL 538 and the PR 540 may be removed, resulting in the diffracted optical element 500 shown in FIG. 5G.

Figure 5H:
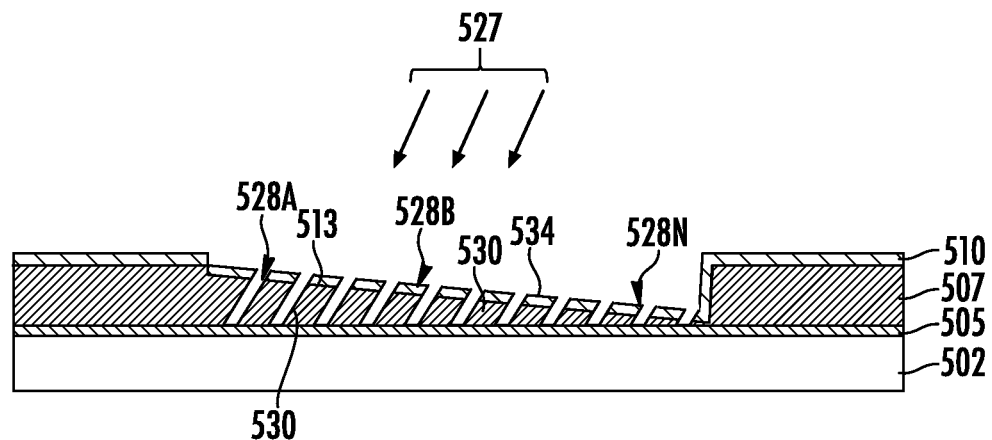

As shown in FIG. 5H, the diffracted optical element 500 is then etched 527 to form plurality of angled trenches 528A-N through the optical grating layer 507. In some embodiments, the etch 527 is an angled ion etch, wherein the angled ion etch is performed by a reactive ion beam selective to the etch stop layer 505. The substrate 502 may be scanned along a scan direction with respect to the reactive ion beam. As shown, the etch 527 may be delivered at a non-zero angle with respect to a perpendicular to a plane defined by the top surface 513 of the optical grating layer 507. During the etch 527, the second hardmask 534 functions as a pattern guide for formation of a plurality of slanted grating structures 530. As shown, a first depth of a first trench 528A of the plurality of trenches is different than a second depth of a second trench 528B due to the etch 527. The first and second hardmasks 510, 534 may then be removed, resulting in a structure similar to device 400 in FIG. 4F.

For the sake of convenience and clarity, terms such as "top," "bottom," "upper," "lower," "vertical," "horizontal," "lateral," and "longitudinal" will be used herein to describe the relative placement and orientation of components and their constituent parts as appearing in the figures. The terminology will include the words specifically mentioned, derivatives thereof, and words of similar import.

As used herein, an element or operation recited in the singular and proceeded with the word "a" or "an" is to be understood as including plural elements or operations, until such exclusion is explicitly recited. Furthermore, references to "one embodiment" of the present disclosure are not intended as limiting. Additional embodiments may also incorporate the recited features.

Furthermore, the terms "substantial" or "substantially," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

Still furthermore, one of ordinary skill will understand when an element such as a layer, region, or substrate is referred to as being formed on, deposited on, or disposed "on," "over" or "atop" another element, the element can be directly on the other element or intervening elements may also be present. In contrast, when an element is referred to as being "directly on," "directly over" or "directly atop" another element, no intervening elements are present.

As used herein, "depositing" and/or "deposited" may include any now known or later developed techniques appropriate for the material to be deposited including although not limited to, for example: chemical vapor deposition (CVD), low-pressure CVD (LPCVD), and plasma-enhanced CVD (PECVD). "Depositing" and/or "deposited" may also include semi-atmosphere CVD (SACVD) and high-density plasma CVD (HDPCVD), rapid thermal CVD (RTCVD), ultra-high vacuum CVD (UHVCVD), limited reaction processing CVD (LRPCVD), and metal-organic CVD (MOCVD). "Depositing" and/or "deposited" may also include sputtering deposition, ion beam deposition, electron beam deposition, laser assisted deposition, thermal oxidation, thermal nitridation, spin-on methods, and physical vapor deposition (PVD). "Depositing" and/or "deposited" may also include atomic layer deposition (ALD), chemical oxidation, molecular beam epitaxy (MBE), plating, evaporation.

In various embodiments, design tools can be provided and configured to create the datasets used to pattern the layers of diffracted optical elements 400 and 500 e.g., as described herein. For example, data sets can be created to generate photomasks used during lithography operations to pattern the layers for structures as described herein. Such design tools can include a collection of one or more modules and can also be comprised of hardware, software or a combination thereof. Thus, for example, a tool can be a collection of one or more software modules, hardware modules, software/hardware modules or any combination or permutation thereof. As another example, a tool can be a computing device or other appliance running software, or implemented in hardware.

As used herein, a module might be implemented utilizing any form of hardware, software, or a combination thereof. For example, one or more processors, controllers, ASICs, PLAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading the description, the various features and functionality described herein may be implemented in any given application. Furthermore, the various features and functionality can be implemented in one or more separate or shared modules in various combinations and permutations. Although various features or elements of functionality may be individually described or claimed as separate modules, one of ordinary skill in the art will understand these features and functionality can be shared among one or more common software and hardware elements.

By utilizing the embodiments described herein, a waveguide having slanted optical grating structures is formed. A first technical advantage of the slanted grating structures of the present embodiments includes improved function of the waveguide by better collecting and directing light passing through the waveguide, thus improving clarity of a projected image. A second technical advantage of the slanted grating structures of the present embodiments includes improved manufacturing efficiency of a waveguide by eliminating more time consuming and difficult processes. Further, a third technical advantage of the slanted grating structures of the present embodiments includes providing a two dimensional or a three-dimensional shape, enabling use of the waveguide in an increased range of applications.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. A method of forming a diffracted optical element, comprising:
   providing an optical grating layer over a substrate;
   patterning a hardmask over the optical grating layer;
   forming a sacrificial layer over the hardmask, the sacrificial layer having a non-uniform height measured from a top surface of the optical grating layer; and
   etching a plurality of angled trenches into the optical grating layer to form an optical grating, wherein a first depth of a first trench of the plurality of trenches is different than a second depth of a second trench of the plurality of trenches, and wherein the etching comprises performing an angled ion etch at a non-zero angle with respect to a perpendicular to a plane defined by the top surface of the optical grating layer.

2. The method of claim 1, wherein forming the sacrificial layer comprises:
   depositing the sacrificial layer atop the hardmask; and
   etching the sacrificial layer to create a trench with a sloped bottom surface.

3. The method of claim 2, further comprising performing a vertical etch to form the trench.

4. The method of claim 2, further comprising:
   etching the optical grating layer to recess the trench into the optical grating layer;
   forming a second hardmask along the sloped bottom surface of the trench;
   forming an optical planarization layer (OPL) and a photoresist (PR) over the hardmask and the second hardmask;
   etching a plurality of vertical trenches through the OPL, the PR, and the second hardmask; and
   removing the OPL and the PR, wherein the plurality of trenches are etched into the optical grating layer following removal of the OPL and the PR.

5. The method of claim 1, wherein the angled ion etch is performed by a reactive ion beam, and wherein the substrate is scanned along a scan direction with respect to the reactive ion beam.

6. The method of claim 1, further comprising forming an etch stop layer over the substrate, wherein the optical grating layer is formed atop the etch stop layer.

7. A method of forming a diffracted optical element, comprising:
   providing an optical grating layer over a substrate;
   providing a hardmask over the optical grating layer, the hardmask including a set of openings;
   forming a sacrificial layer over the hardmask;
   forming a recess in the sacrificial layer, wherein the recess causes the sacrificial layer to have a non-uniform height measured from a top surface of the optical grating layer; and
   etching a plurality of angled trenches through the optical grating layer to form an optical grating, wherein a first depth of a first trench of the plurality of angled trenches is different than a second depth of a second trench of the plurality of trenches, and wherein the etching comprises performing an angled ion etch at a non-zero angle with respect to a perpendicular to a plane defined by the top surface of the optical grating layer.

8. The method of claim 7, wherein forming the sacrificial layer comprises:
   depositing the sacrificial layer atop the hardmask; and
   etching the sacrificial layer to create a sloped bottom surface of the trench.

9. The method of claim 8, further comprising:
   etching the optical grating layer to recess the trench into the optical grating layer;
   forming a second hardmask along the sloped bottom surface of the trench;
   forming an optical planarization layer (OPL) and a photoresist (PR) over the hardmask and the second hardmask;
   etching a plurality of vertical trenches through the OPL, the PR, and the second hardmask; and
   removing the OPL and the PR, wherein the plurality of trenches are etched through the optical grating layer following removal of the OPL and the PR.

10. The method of claim 7, wherein the angled ion etch is performed by a reactive ion beam, and wherein the substrate is scanned along a scan direction with respect to the reactive ion beam.

11. The method of claim 7, further comprising forming an etch stop layer over the substrate, wherein the optical grating layer is formed atop the etch stop layer.

12. A method of forming a diffracted optical element, comprising:
providing an optical grating layer over a substrate;
patterning a hardmask over the optical grating layer;
depositing the sacrificial layer atop the hardmask;
removing a portion of the sacrificial layer to create a trench in the sacrificial layer, the trench including a sloped bottom surface defining a first plane, the first plane being non-parallel with a second plane defined by a top surface of the optical grating layer; and
etching a plurality of angled trenches into the optical grating layer to form an optical grating, wherein a first depth of a first trench of the plurality of trenches is different than a second depth of a second trench of the plurality of trenches, wherein the etching comprises performing an angled ion etch at a non-zero angle with respect to a perpendicular to the second plane defined by the top surface of the optical grating layer.

13. The method of claim 12, further comprising forming the sacrificial layer with a non-uniform height measured from the top surface of the optical grating layer.

14. The method of claim 12, further comprising:
etching the optical grating layer to recess the trench into the optical grating layer;
forming a second hardmask along the sloped bottom surface of the trench;
forming an optical planarization layer (OPL) and a photoresist (PR) over the hardmask and the second hardmask;
etching a plurality of vertical trenches through the OPL, the PR, and the second hardmask; and
removing the OPL and the PR, wherein the plurality of trenches are etched into the optical grating layer following removal of the OPL and the PR.

15. The method of claim 12, wherein the angled ion etch is performed by a reactive ion beam, and wherein the substrate is scanned along a scan direction with respect to the reactive ion beam.

\* \* \* \* \*